(12) United States Patent
Howell et al.

(10) Patent No.: US 6,674,952 B2
(45) Date of Patent: Jan. 6, 2004

(54) FIBER OPTIC CABLE BEND RADIUS PROTECTION SYSTEM

(75) Inventors: Bret L. Howell, Newman Lake, WA (US); Paul N. Poshusta, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 09/846,878

(22) Filed: Apr. 30, 2001

(65) Prior Publication Data

US 2002/0159746 A1 Oct. 31, 2002

(51) Int. Cl.⁷ .................................................. G02B 6/00
(52) U.S. Cl. ........................................ 385/135; 385/137
(58) Field of Search .................................. 385/134–137

(56) References Cited

U.S. PATENT DOCUMENTS

| | | |
|---|---|---|
| 4,373,776 A | 2/1983 | Purdy |
| 4,679,896 A | 7/1987 | Krafcik et al. |
| 4,792,203 A | 12/1988 | Nelson et al. |
| 4,824,196 A | 4/1989 | Bylander |
| 4,840,449 A | 6/1989 | Ghandeharizadeh |
| 4,900,123 A | 2/1990 | Barlow et al. |
| 4,911,521 A | 3/1990 | Ryuto et al. |
| 5,052,775 A | 10/1991 | Bossard et al. |
| 5,119,459 A | 6/1992 | Meyerhoefer et al. |
| 5,127,082 A | 6/1992 | Below et al. |
| 5,142,606 A | 8/1992 | Carney et al. |
| 5,167,001 A | 11/1992 | Debortoli et al. |
| 5,212,761 A | 5/1993 | Petrunia |
| 5,323,478 A | 6/1994 | Milanowski et al. |
| 5,363,467 A | 11/1994 | Keith |
| 5,428,705 A | 6/1995 | Hermsen et al. |
| 5,430,823 A | 7/1995 | Dupont et al. |
| 5,450,518 A | 9/1995 | Burek et al. |
| 5,490,229 A | 2/1996 | Ghandeharizadeh et al. |
| 5,511,144 A | 4/1996 | Hawkins et al. |
| 5,617,501 A | 4/1997 | Miller et al. |
| 5,689,605 A | 11/1997 | Cobb et al. |
| 5,734,775 A | 3/1998 | Vidacovich et al. |
| 5,778,131 A | 7/1998 | Llewellyn et al. |
| 5,802,237 A | 9/1998 | Pulido |
| 5,804,765 A | 9/1998 | Siemon et al. |
| 5,835,657 A | 11/1998 | Suarez et al. |
| 5,870,519 A | 2/1999 | Jenkins et al. |
| 5,887,106 A | 3/1999 | Cheeseman et al. |
| 5,946,440 A | 8/1999 | Puetz |
| 5,987,207 A | 11/1999 | Hoke |
| 6,009,224 A | 12/1999 | Allen |
| 6,009,225 A | 12/1999 | Ray et al. |
| 6,061,492 A | 5/2000 | Strause et al. |
| 6,081,645 A | 6/2000 | Dotzer et al. |
| 6,215,938 B1 | 4/2001 | Reitmeier et al. |
| 6,227,718 B1 | 5/2001 | Harvey et al. |
| 6,408,124 B1 * | 6/2002 | Holman et al. ............. 385/135 |

FOREIGN PATENT DOCUMENTS

| | | |
|---|---|---|
| WO | 95/29418 | 11/1995 |
| WO | 98/13713 | 4/1998 |
| WO | 99/38042 | 7/1999 |
| WO | 99/42881 | 8/1999 |

* cited by examiner

*Primary Examiner*—Neil Abrams
*Assistant Examiner*—Son V. Nguyen
(74) *Attorney, Agent, or Firm*—Wells St. John P.S.

(57) ABSTRACT

A bend radius protection system for multiple applications with fiber optic cables, and which includes a first inwardly facing curved passageway wall and a passageway base surface at a first end of the base framework; a first bend radius guide groove in the base framework; and a first bend radius guide corresponding to and inserted in the first bend radius guide groove in the base framework, the first bend radius guide having an outwardly facing curved surface; wherein the first inwardly facing curved passageway wall, the passageway base surface and the outwardly facing curved surface, define a fiber optic cable passageway with an opening. The invention may further include a first grooming arm rotatably mounted to the base framework and disposed across the opening of the passageway such that when the first grooming arm is rotated, the forward edge urges fiber optic cables protruding through the opening back into the passageway.

25 Claims, 5 Drawing Sheets

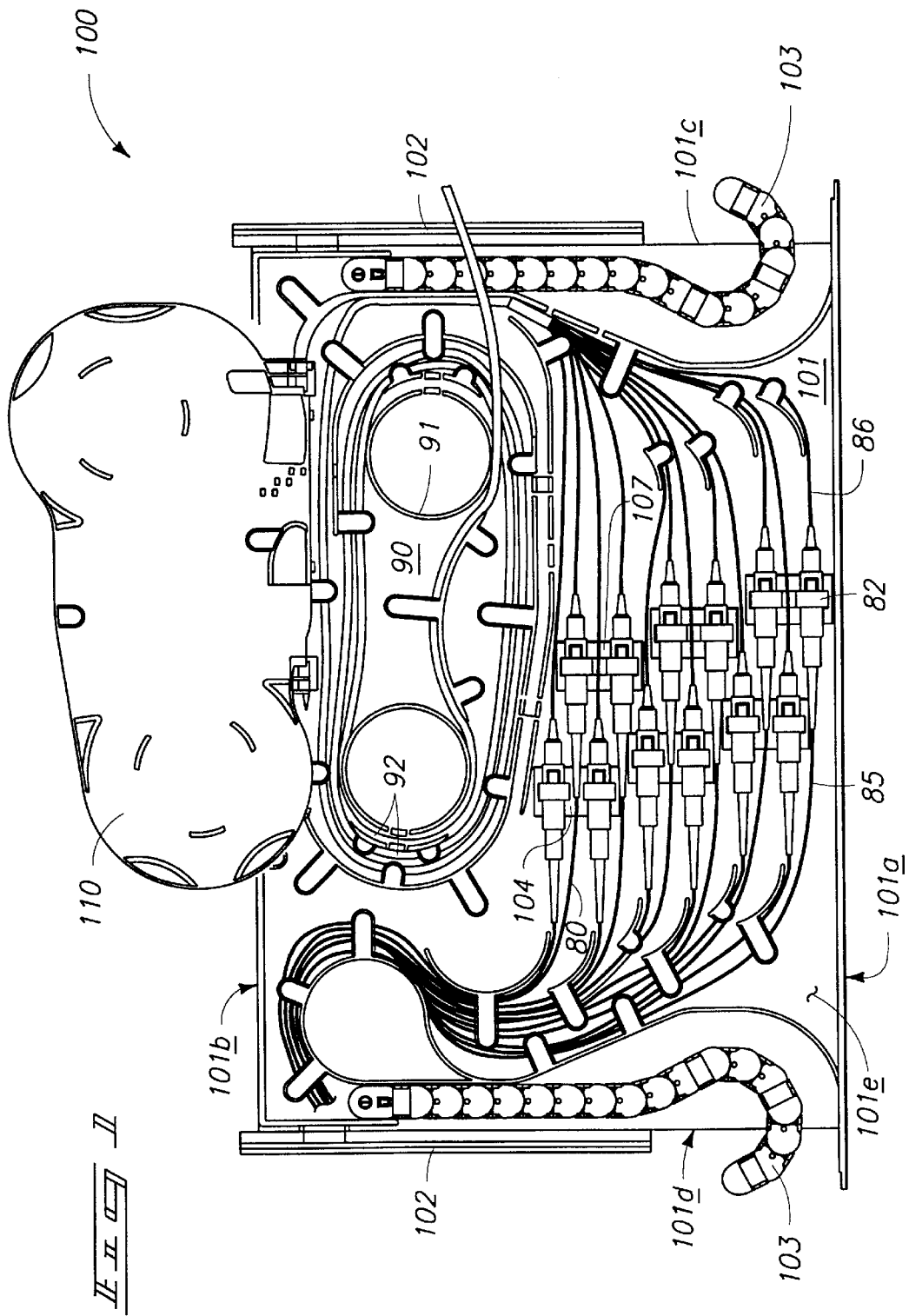

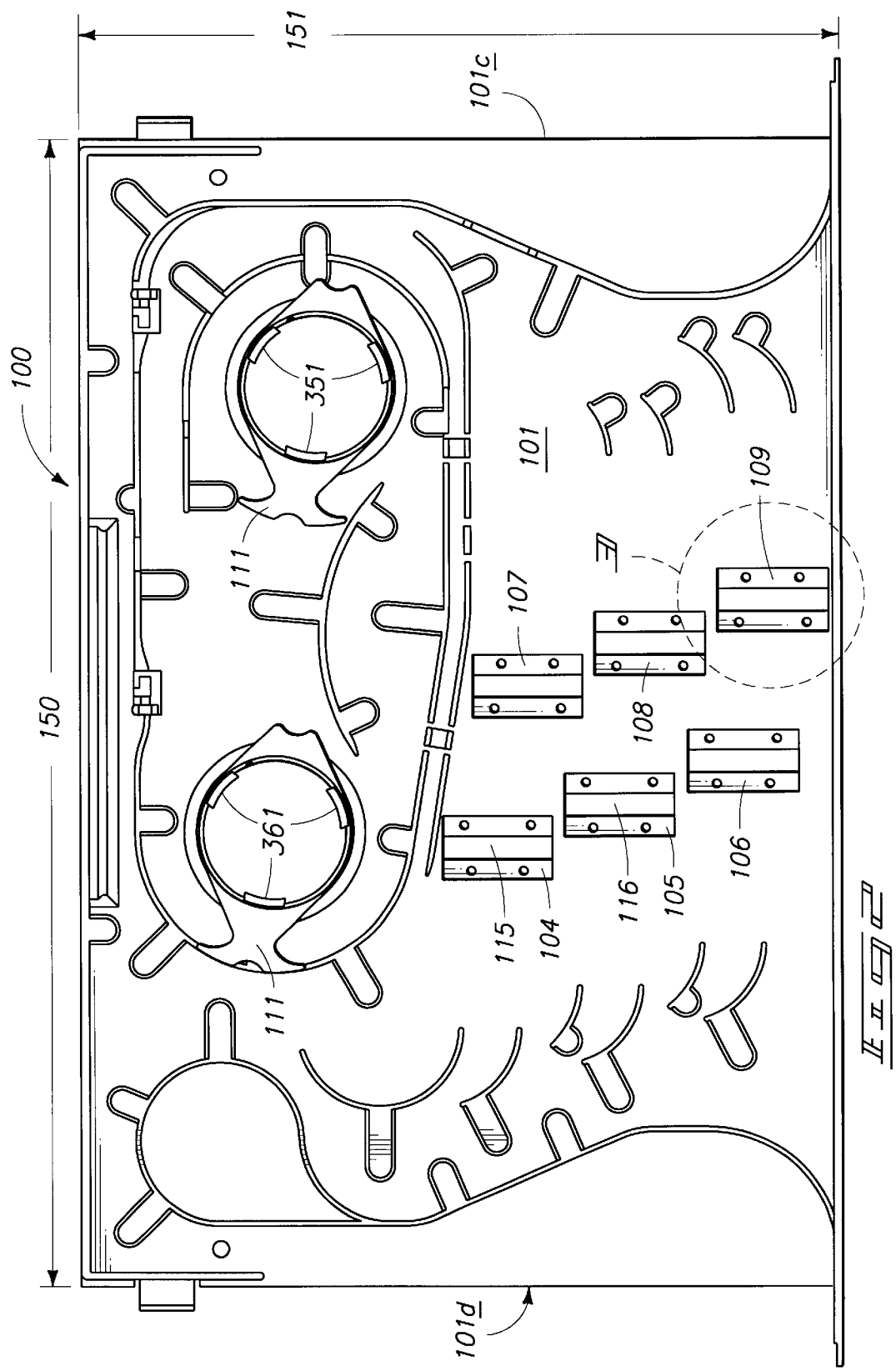

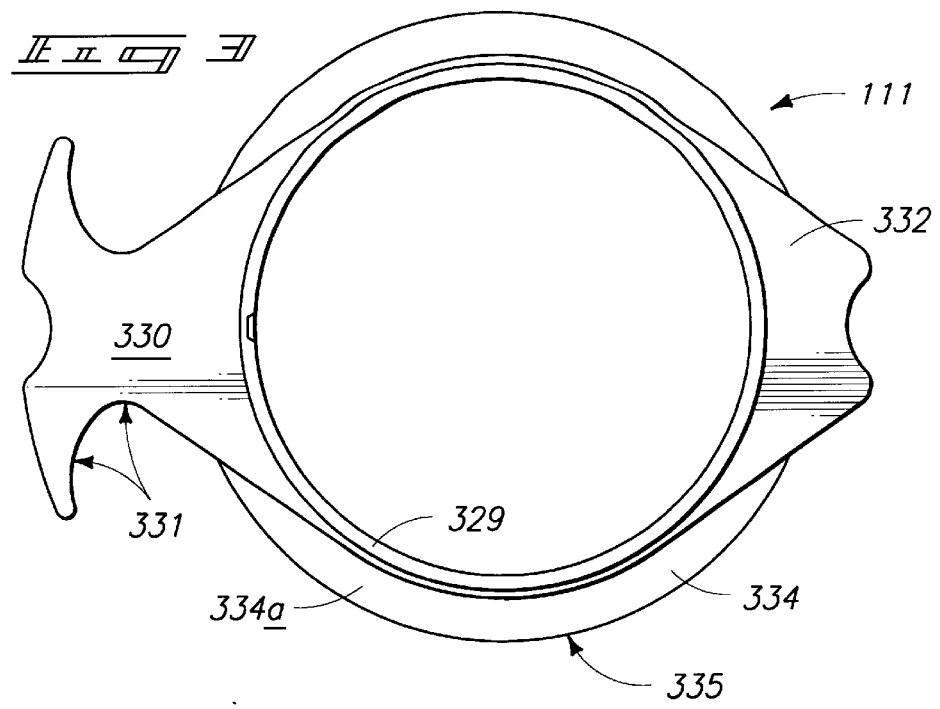
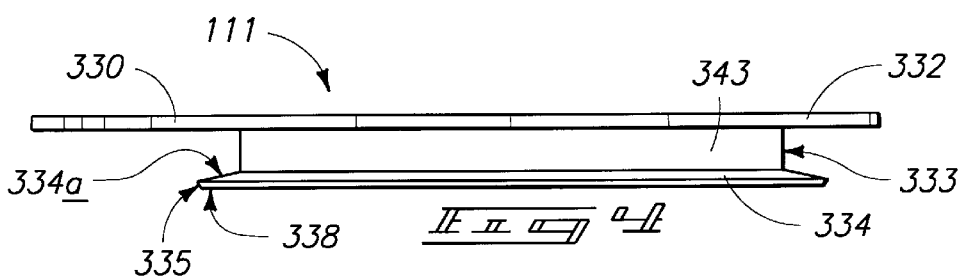
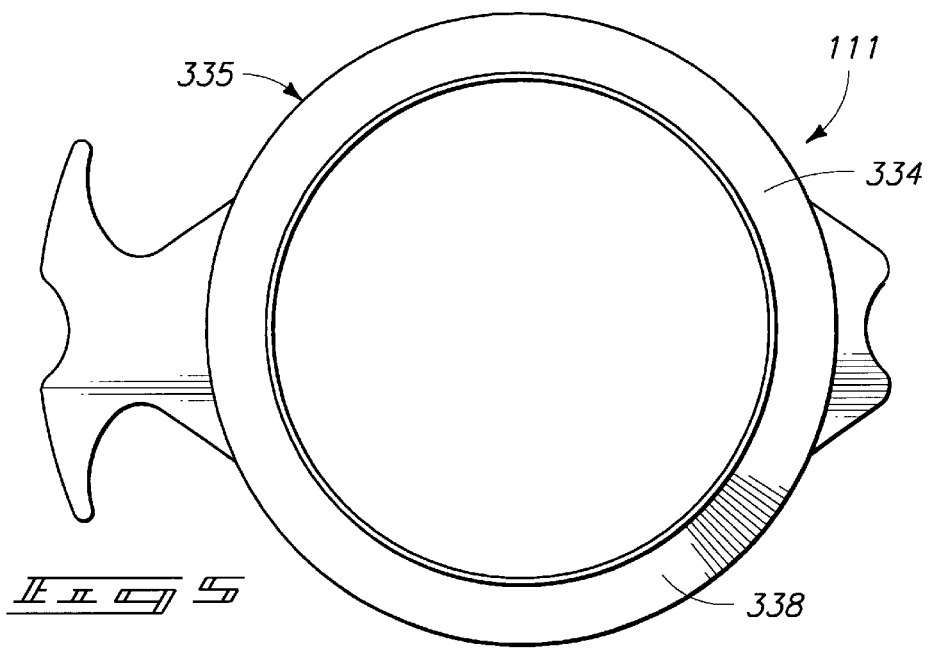

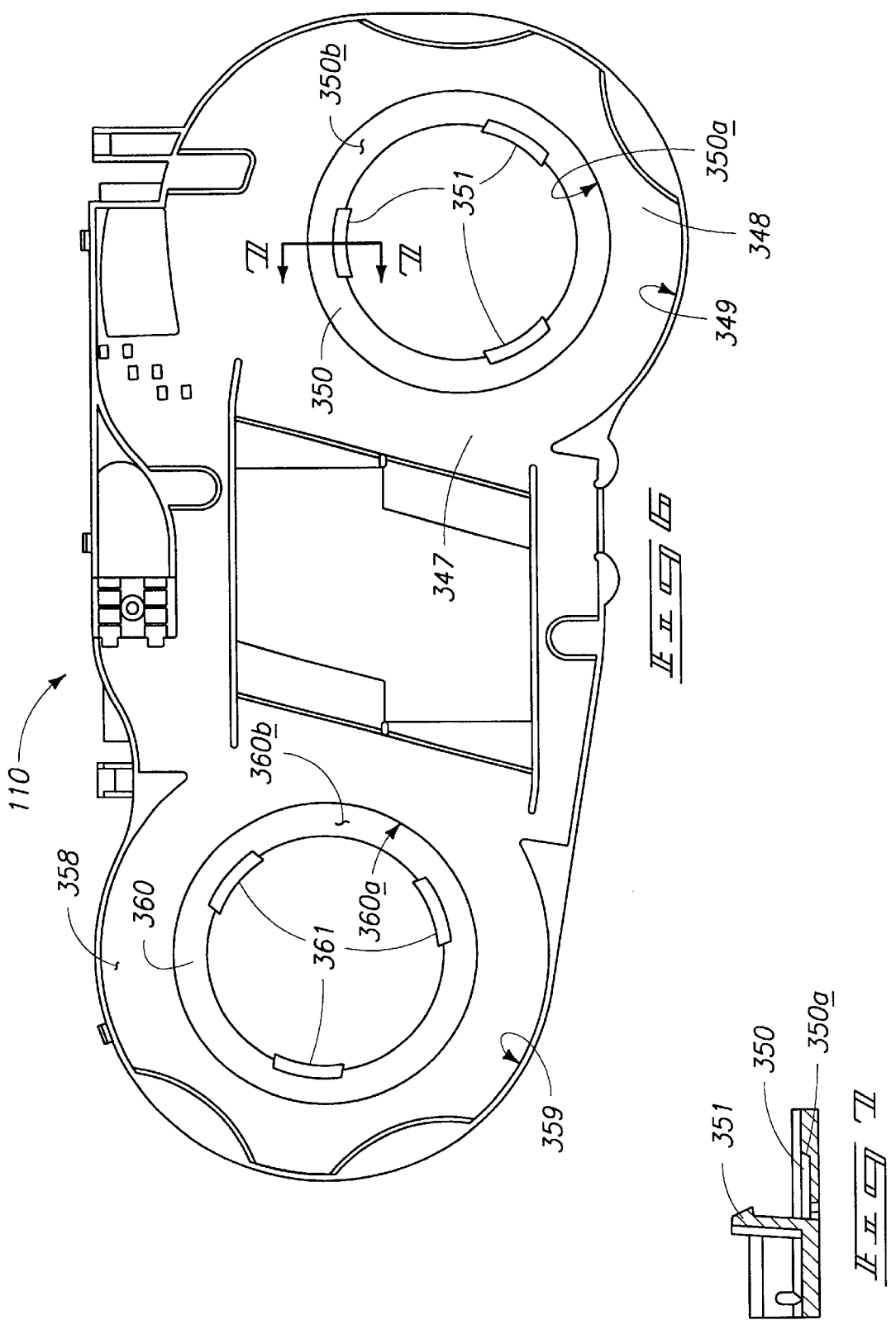

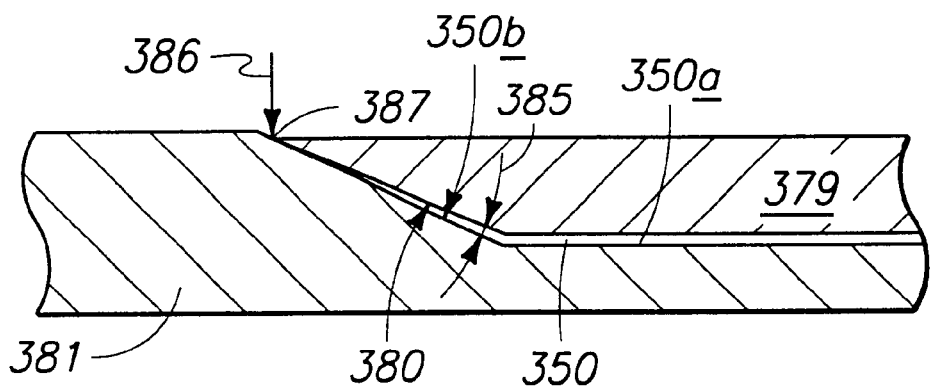
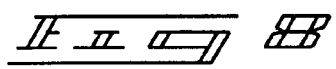
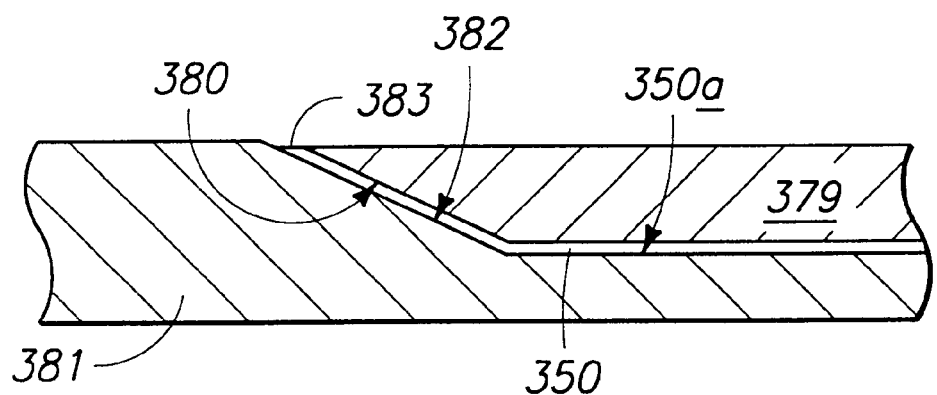
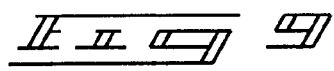

FIBER OPTIC CABLE BEND RADIUS PROTECTION SYSTEM

TECHNICAL FIELD

This invention pertains to a fiber optic cable bend radius protection system primarily for use in telecommunications facilities. More particularly this invention pertains to a fiber optic bend radius protection system which includes an outwardly facing surface, an inwardly facing surface and a bottom surface, comprising a fiber optic cable passageway with bend radius protection, and which may include one or more grooming arms for maintaining the fiber optic cables in the passageway.

BACKGROUND OF THE INVENTION

With the large increase in demand for telecommunications capacity, there is an increasing need for greater density and capacity in all areas of telecommunications, including signal transmission, connections or cross-connections, and terminations. The better utilization of a given amount of space in telecommunications facilities is becoming more and more important.

In many facilities there are bays or racks in which different types of cabinets and other equipment are mounted. Generally a telecommunication fiber optic cable distribution bay or panel is located in the central office of a telephone system or at a remote location near a customer's premises. The purpose of the distribution bay or panel is to provide termination, cross-connect, splice, patch and storage interface between fiber-optic cables that lead to user installations.

These bays typically include multiple components that have fiber-optic splice cable storage, cross connection and/or patching functions or features.

Because of the delicate and precise nature of optical fibers, it is important that the individual fibers not be overly bent, or unduly stressed, in the distribution system, otherwise the transmission effectiveness and efficiency may be compromised. Consequently, consideration must be given in the design, construction and operation of the trays so that the fiber-optic cables are not subjected to compromising bends or stresses.

In the management of fiber optic cables, it is important to maintain a minimum bend radius to protect the fiber optic cables. Two typical minimum bend radii for example are one and one-half inches, or thirty millimeters (30 mm). It is also important to minimize or eliminate all areas where fiber optic cables may be pinched, overly bent or damaged.

It is an object of this invention to provide a fiber optic cable bend radius protection system which provides for the management and protection of fiber optic cables in all applications, including higher density applications.

BRIEF DESCRIPTION OF THE DRAWINGS

Preferred embodiments of the invention are described below with reference to the following accompanying drawings.

FIG. 1 is a top perspective view of one embodiment of a fiber optic cable connector tray system in which this invention may be utilized in a splice housing application;

FIG. 2 is a top view of an application of an embodiment of this invention wherein the system is integrated with fiber optic cable storage;

FIG. 3 is a top view of an embodiment of a spool and grooming arm which may be utilized in this invention;

FIG. 4 is an elevation view of the embodiment of the spool and grooming arm illustrated in FIG. 3;

FIG. 5 is a bottom view of the embodiment of the spool and grooming arm illustrated in FIG. 3;

FIG. 6 is a top view of one embodiment of the fiber optic cable bend radius protection system integrated in a splice housing, as contemplated by this invention;

FIG. 7 is an elevation detail view of the embodiment of section lines 7—7 from FIG. 6, illustrating one embodiment of a resilient latch mechanism which may be utilized FIG. 8 is a detail view of the outer edge of the bend radius guide interacting with the side surface of the base showing a force imparted on the bend radius guide to hold it against the base; and FIG. 9 is an alternative detail view of the outer edge of the bend radius guide interacting with the side surface of the base showing a force imparted on the bend radius guide to hold it against the base.

DETAILED DESCRIPTION OF THE PREFERRED EMBODIMENT(S)

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term "generally oriented", such as when used in the context of generally oriented from the first side to the second side of the tray framework, not only means longitudinally aligned between the two sides, but also angles up to and including a forty-five degree angle from a perpendicular line between the two sides.

The term "fiber optic connector" or "connector" as used herein is well known and defined in the art, and is intended to broadly cover all types and kinds of connectors, past and future, no one of which is necessary to practice this invention. Generally a connector is a mechanical device used to align and join two fiber optic cables together to provide a means to attach and decouple it to transmitters, receivers or to another fiber optic cable. Commonly used connectors are, without limitation, ST Connector-Compatible connectors, FC-Type, FCPC, Biconic, S.C., SC-Angled, E2000, E2000-Angled, D4, and SMA 905 or 906 connectors.

The term "fiber optic adapter" or "adapter" as used herein is also well known and defined in the art, and is the apparatus which retains the fiber optic connectors and provides the structure to hold the fiber optic connectors and to mount the connectors to other equipment, panels, bulkheads, frameworks, and the like. "Adapter" is sometimes also referred to as a coupling or mating bushing in the industry. Commonly used or well known adapters are, without limitation, ST Connector-Compatible adapters, FC-Type, FCPC, Biconic, S.C., SC-Angled, E2000, E2000-Angled, D4, and SMA 905 or 906 adapters.

The tray or tray framework may or may not have side walls, a front wall or a rear wall.

The term "bend radius guide" or spool may provide a guide surface for all or part of three-hundred sixty degrees, for instance it may only provide the bend radius guide surface for ninety degrees, one hundred eighty degrees, two hundred seventy degrees, to name a few examples.

The term "wall", "passageway wall", mean either a continuous or non-continuous wall, guide or series of guide structures.

The term surface, curved surface, curved passageway surface, mean either a continuous or non-continuous surface, guide or series of guide structures.

The term "splice holder" may be any one of numerous known structures which receive, retain and/or hold splices, within the contemplation of this invention, which are well known in the art.

The term "latch" as used herein means and includes, without limitation, a resilient member and a non-resilient member which secures or attaches the fiber optic cable adapters to the adapter mount areas of the adapter holding structure.

FIG. 1 illustrates a tray system 100 in which an embodiment of this invention may be utilized, showing tray framework 101 with front end 101a or first end, second end 101b or rear end, first side 101c and second side 101d. The invention may be utilized in the splice housing 110 and/or on the tray framework 101 in the storage area 90.

The base, bulkhead or surface 101e of tray framework 101 may serve as a structure upon which to mount other components. FIG. 2 illustrates a plurality of fiber optic cable adapter holder recipient structures 104, 105, 106, 107, 108 and 109. The apertures in the base or framework allow adapter holding structures which are inserted into adapter holder recipient structures to be accessed from the lower side of the tray to allow them to be slid upward more easily.

FIG. 1 shows fiber optic cable management and bend radius protection guides 103 are provided on the sides of the tray framework for routing of fiber optic cables into or out of either side of the tray system. The height of the tray is preferably approximately 1.75 inches in a preferred embodiment, which is generally referred to as a rack unit of measure. A typical standard size tray would fit into a 19-inch rack and would be approximately 12 inches deep, 1.75 inches tall for one rack unit tray. The tray would be slightly less than the width of the rack to facilitate mounting.

If the tray framework is slidably mounted within a cabinet, as contemplated by some embodiments of this invention, it would be slidably mounted via slide rails 102 as shown in FIG. 1.

When fiber optic adapter holding structures are mounted within the fiber optic adapter holder recipient structures, they will be generally oriented from the front end 101a (also the first end) to the rear end 101b (also the second end), which generally orients adapters, connectors and fiber optic cables from the first side to the second side of the tray framework. Toward the second end 101b or rear of the tray framework is an area where various functions may be accomplished, such as storage or splicing of fiber optic cables in the tray.

In order to facilitate a denser fiber optic cable arrangement, a splice housing 110 may be pivotally mounted to the tray framework 101 such that storage and/or splice functions may be accomplished at two levels, the first within the splice housing 110 and the second below the splice housing.

FIG. 1 shows a tray fully loaded with fiber optic cable, connectors and adapters, with fiber optic cables routed through the tray framework 101. FIG. 1 illustrates fiber optic storage area 90 with storage or wrap spools 91 and 92. FIG. 1 illustrates for instance fiber optic cable 80 which is connected to a fiber optic connector or adapter which is mounted within adapter holding recipient structure 107 is routed through a fiber optic cable passageway in the adapter holding structure mounted within adapter holding recipient structure 104.

FIG. 1 further shows an adapter holding structure 82 with a first fiber optic cable 85 operatively attached or connected to the adapter or connector held by the adapter holding structure on its first side and a second fiber optic cable 86 operatively connected or attached to the adapter or connector held on the second side of the adapter or adapter holding structure 82. Adapters and connectors are very well known in the industry and will not therefore be discussed in significant detail.

FIG. 2 is a top view of another example of an environment in which an embodiment of this invention may be utilized, as this invention is applied to a fiber optic storage area application. FIG. 2 illustrates a tray system 100, tray framework 101, base or framework apertures 115 and 116, the tray depth 151 and tray width 150. Although tray width 150 and tray depth 151 have been described above with respect to an industry standard 19-inch-wide application, other industry standard applications in various countries may also be utilized, or custom applications may also be utilized, as no one particular width or depth is necessary to practice this invention.

FIG. 2 illustrates the application of this fiber optic cable bend radius protection system in a fiber optic storage system, illustrating bend radius guides 111 rotatably mounted to the tray framework 101 via latches 351 and 361. Bend radius guides 111 which may be used in the storage area application are shown and described in more detail below.

FIG. 3 is a top view of one embodiment of a bend radius guide 111 which may be utilized in a fiber optic cable bend radius protection system as contemplated in this invention, illustrating bend radius guide 111, first transverse flange 334 with outward edge 335 and inner rim 329 on the bend radius guide 111. First grooming arm 330 includes curved surface 331 on the forward or leading edge of the grooming arm 330. When bend radius guide 111 is rotated, grooming arm 330 is preferably disposed above a fiber optic cable passageway, and tends to groom, push or move the fiber optic cables in the passageway downward back into the passageway or opening over which it is disposed. Second grooming arm 332 likewise acts to maintain the fiber optic cables in the desired or predetermined fiber optic cable passageway when bend radius guide 111 is rotated.

FIG. 4 is an elevation view of the embodiment of the bend radius guide illustrated in FIG. 3, showing bend radius guide 111, first grooming arm 330, second grooming arm 332, first transverse flange 334 with the flanged surface 334a and outward edge 335. The bottom outward portion 338 of first transverse flange 334 would be located in a groove provided by a base as explained and shown more fully below.

FIG. 4 also illustrates an outwardly facing curve surface 343 of the bend radius guide 111 which provides a surface against which fiber optic cables may be routed and bend radius thereby maintained. Although FIG. 4 does not illustrate, there is preferably a curved surface between the first transverse facing surface 334a and the outwardly facing curve surface 333 to further protect fiber optic cables routed adjacent thereto or abutting.

FIG. 5 is a bottom view of the bend radius guide 111 with guide framework, and illustrates the bottom outward surface 338 of first transverse flange 334, with outward edge 335. The first transverse flange bottom surface would preferably insert into a groove within a base at a bias force or pressure to force outward edge 335 against a side surface to prevent fiber optic cables from being pinched between the two structures which would be interconnected.

FIG. 6 shows a splice housing 110 structure, which is merely one of the applications within which the invention may be utilized. The invention for instance may also be applied in a storage area, as also referenced above. FIG. 6 illustrates fiber optic cable passageways 348 and 358, inwardly facing surfaces 349 and 359, and base 347 with first groove 350. Fiber optic cables may be routed through fiber optic cable passageways 348 and 358 with the inwardly facing surfaces 349 and 359 acting as guides and providing bend radius protection in combination with outwardly facing curve surfaces such as item 343 as illustrated in FIG. 4. First groove 350 and second groove 360 provide the recessed areas into which first transverse flange 334 (shown in prior figures) may be inserted. Resilient latches 351 and 361 may impart an outward and downward force on ledge 333 of bend radius guide 111 to place a bias force on bend radius guide 111 into first groove 350. The placement of the bias force on the outward edge 335 (shown in prior figures) serves to prevent fiber optic cables of any diameter from being inadvertently pinched or caught between components.

FIG. 6 further illustrates second groove 360 with base surface 362 and latches 361. First outward edge 350a of first groove 350 is typically at an angle as will be shown more fully in later figures, and is the surface against which the outward edge of the tray framework 111 would be applied to provide protection to the fiber optic cables. The base 360b of groove 360 provides a downward surface as does base 350b of first groove 350.

FIG. 7 is section view 7—7 from FIG. 6 and illustrates latch 351, groove 350 with side surface 350a to groove 350. Groove 350 is configured to receive a bend radius guide 111 such as that shown in FIGS. 3, 4 & 5, and latches such as latch 351 are configured to impart a downward force on an outer edge of the bend radius guide first transverse flange to assure fiber optic cables do not become pinched or trapped between components.

FIG. 8 shows one embodiment of the interaction between the outer edge of a tray framework transverse flange 379. FIG. 8 illustrates groove 350 with groove base surface 350a, side surface 350b which is at an angle relative to base surface 350a. First transverse flange 379 of a bend radius guide also has a side surface 380 at an angle, the relative angles between side surface 380 and side surface 350b providing a gap and allowing the outward-most portion of the side surface 380 to contact the base groove to assure that the force 386 is applied right where it is needed and does not provide a gap into which fiber optic cables may become trapped or pinched. The outward-most point 387 would then provide zero clearance or zero gap between first transverse flange 379 and base 381.

FIG. 9 shows an alternative embodiment of the relative configuration of the edges, illustrating first transverse flange 379 with side surface 380, groove 350 with grooved base surface 350a and end edge 383 which may be a more resilient member or portion of first transverse flange 379. In the embodiment illustrated in FIG. 9, the relative angles on the side surfaces may be the same and the biasing force may be applied by bending outward end portion 383 to keep the force on the very outward edge thereof, against base 381.

As will be appreciated by those of reasonable skill in the art, there are numerous embodiments to this invention, and variations of elements and components which may be used, all within the scope of this invention.

One embodiment of this invention for example involves a bend radius protection system comprising: a base framework comprising a first inwardly facing curved passageway wall and a passageway base surface at a first end of the base framework; a first bend radius guide groove in the base framework; and a first bend radius guide corresponding to and inserted in the first bend radius guide groove in the base framework, the first bend radius guide having an outwardly facing curved surface; wherein the first inwardly facing curved passageway wall, the passageway base surface and the outwardly facing curved surface, define a fiber optic cable passageway with an opening. This embodiment may also be combined with a first grooming arm rotatably mounted to the base framework and disposed across the opening of the passageway such that when the first grooming arm is rotated, the forward edge urges fiber optic cables protruding through the opening back into the passageway. In one embodiment of the invention, the forward or leading edge of the grooming arm is concave.

The invention also contemplates the foregoing, and further wherein the grooming arm is integral with the first bend radius guide such that the grooming arm and the first bend radius guide are rotatably mounted to the base framework. The invention further contemplates an embodiment wherein the first bend radius guide further comprises a first flange transverse to the outwardly facing curved surface and wherein the first flange is configured for insertion in the first bend radius guide groove in the base framework and has a passageway surface which further defines the fiber optic cable passageway.

A further embodiment of the invention may be wherein the first bend radius guide groove has an outwardly angled outer side wall; and the first flange has an outer edge which is configured to abut the outer side wall. The invention may also include placing a bias force against the outer side wall, and further wherein the bias force against the outer side wall is provided by a resilient latch on one of the base framework and the first bend radius guide, the resilient latch interacting with the other of the base framework and the first bend radius guide.

The invention further contemplates an embodiment which includes a second grooming arm integral with the first grooming arm, the second grooming arm being disposed across the opening of the passageway such that when the second grooming arm is rotated, the forward edge urges fiber optic cables protruding through the opening back into the passageway.

An embodiment or application of the invention is integrated in and include a fiber optic cable splice housing, which would comprise a base framework with a first end and a second end, the base framework comprising: an inlet passageway; a first fiber bend radius guide at the first end disposed to receive fiber optic cables from the fiber input passageway; a splice holder mount area configured for mounting a splice holder, the mounted splice holder being disposed to receive and retain splices in fiber optic cables routed from the first bend radius guide; a second fiber bend radius guide at the second end disposed to receive fiber optic cables from the splice holder; an outlet passageway disposed to receive fiber optic cables from the second fiber bend radius guide; a first inwardly facing curved passageway wall and a passageway base surface at the first end of the base framework; and wherein one of the first fiber bend radius guide and the second fiber bend radius guide is comprised of: an outwardly facing curved surface; wherein the first inwardly facing curved passageway wall, the passageway base surface and the outwardly facing curved surface, define a fiber optic cable passageway with an opening.

Additional embodiments of a fiber optic cable splice housing embodiment as recited above would further include: a first grooming arm rotatably mounted to the base framework and disposed across the opening of the passageway such that when the first grooming arm is rotated, the forward edge urges fiber optic cables protruding through the opening back into the passageway; or wherein the grooming arm is integral with the first bend radius guide such that the grooming arm and the first bend radius guide are rotatably mounted to the base framework; or wherein the first bend radius guide further comprises a first flange transverse to the outwardly facing curved surface and wherein the first flange is configured for insertion in a first bend radius guide groove in the base framework and has a passageway surface which further defines the fiber optic cable passageway. This may further include a combination wherein the first bend radius guide groove has an outwardly angled outer side wall; and the first flange has an outer edge which is configured to abut the outer side wall. The outer edge of the first flange may also be bias forced against the outer side wall.

The bias forcing of the outer edge of the first flange may be by a resilient latch on one of the base framework and the first bend radius guide, the resilient latch interacting with the other of the base framework and the first bend radius guide.

Some of the foregoing embodiments may be further combined with a second grooming arm integral with the first grooming arm, the second grooming arm being disposed across the opening of the passageway such that when the second grooming arm is rotated, the forward edge urges fiber optic cables protruding through the opening back into the passageway.

An embodiment or application of the invention is integrated in and includes a fiber optic cable storage area, which would comprise a base framework with a first end and a second end, the base framework comprising: an inlet passageway; a first fiber bend radius guide at the first end disposed to receive fiber optic cables from the fiber input passageway; a second fiber bend radius guide at the second end disposed to receive fiber optic cables from the first fiber bend radius guide; an outlet passageway disposed to receive fiber optic cables from the second fiber bend radius guide; a first inwardly facing curved passageway wall and a passageway base surface at the first end of the base framework; and wherein one of the first fiber bend radius guide and the second fiber bend radius guide is comprised of: an outwardly facing curved surface; wherein the first inwardly facing curved passageway wall, the passageway base surface and the outwardly facing curved surface, define a fiber optic cable passageway with an opening.

Additional embodiments of a fiber optic cable storage area embodiment as recited above would further include: a first grooming arm rotatably mounted to the base framework and disposed across the opening of the passageway such that when the first grooming arm is rotated, the forward edge urges fiber optic cables protruding through the opening back into the passageway; or wherein the grooming arm is integral with the first bend radius guide such that the grooming arm and the first bend radius guide are rotatably mounted to the base framework; or wherein the first bend radius guide further comprises a first flange transverse to the outwardly facing curved surface and wherein the first flange is configured for insertion in a first bend radius guide groove in the base framework and has a passageway surface which further defines the fiber optic cable passageway. This may further include a combination wherein the first bend radius guide groove has an outwardly angled outer side wall; and the first flange has an outer edge which is configured to abut the outer side wall. The outer edge of the first flange may also be bias forced against the outer side wall.

The bias forcing of the outer edge of the first flange may be by a resilient latch on one of the base framework and the first bend radius guide, the resilient latch interacting with the other of the base framework and the first bend radius guide.

Some of the foregoing embodiments may be further combined with a second grooming arm integral with the first grooming arm, the second grooming arm being disposed across the opening of the passageway such that when the second grooming arm is rotated, the forward edge urges fiber optic cables protruding through the opening back into the passageway.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A bend radius protection system comprising:
   a base framework comprising
      a first inwardly facing curved passageway wall and a passageway base surface at a first end of the base framework;
      a first bend radius guide groove in the base framework; and
   a first bend radius guide corresponding to and inserted in the first bend radius guide groove in the base framework, the first bend radius guide having an outwardly facing curved surface; wherein the first inwardly facing curved passageway wall, the passageway base surface and the outwardly facing curved surface, define a fiber optic cable passageway with an opening.

2. A bend radius protection system as recited in claim 1, and further comprising a first grooming arm rotatably mounted to the base framework and disposed across the opening of the passageway such that when the first grooming arm is rotated, a forward edge of the first grooming arm urges fiber optic cables protruding through the opening back into the passageway.

3. A bend radius protection system as recited in claim 1 and wherein the grooming arm is integral with the first bend radius guide such that the grooming arm and the first bend radius guide are rotatably mounted to the base framework.

4. A bend radius protection system as recited in claim 1 and further wherein the first bend radius guide further comprises a first flange transverse to the outwardly facing curved surface and wherein the first flange is configured for insertion in the first bend radius guide groove in the base framework and has a passageway surface which further defines the fiber optic cable passageway.

5. A bend radius protection system as recited in claim 4, and further wherein:
the first bend radius guide groove has an outwardly angled outer side wall; and
the first flange has an outer edge which is configured to abut the outer side wall.

6. A bend radius protection system as recited in claim 5 and further wherein the outer edge of the first flange is bias forced against the outer side wall.

7. A bend radius protection system as recited in claim 6, and further wherein the outer edge of the first flange is bias forced against the outer side wall by a resilient latch on one of the base framework and the first bend radius guide, the resilient latch interacting with the other of the base framework and the first bend radius guide.

8. A bend radius protection system as recited in claim 2 and further wherein the forward edge is concave.

9. A bend radius protection system as recited in claim 1 and further comprising a second grooming arm integral with the first grooming arm, the second grooming arm being disposed across the opening of the passageway such that when the second grooming arm is rotated, the forward edge urges fiber optic cables protruding through the opening back into the passageway.

10. An integrated bend radius protection system in a fiber optic cable splice housing, comprising:
a base framework with a first end and a second end, the base framework comprising:
an inlet passageway;
a first fiber bend radius guide at the first end disposed to receive fiber optic cables from the fiber input passageway;
a splice holder mount area configured for mounting a splice holder, the mounted splice holder being disposed to receive and retain splices in fiber optic cables routed from the first bend radius guide;
a second fiber bend radius guide at the second end disposed to receive fiber optic cables from the splice holder;
an outlet passageway disposed to receive fiber optic cables from the second fiber bend radius guide;
a first inwardly facing curved passageway wall and a passageway base surface at the first end of the base framework; and
wherein one of the first fiber bend radius guide and the second fiber bend radius guide is comprised of: an outwardly facing curved surface; wherein the first inwardly facing curved passageway wall, the passageway base surface and the outwardly facing curved surface, define a fiber optic cable passageway with an opening, and further comprising a first grooming arm rotatably mounted to the base framework and disposed across the opening of the passageway such that when the first grooming arm is rotated, the forward edge urges fiber optic cables protruding through the opening back into the passageway.

11. An integrated bend radius protection system in a fiber optic cable splice housing as recited in claim 10, and wherein the grooming arm is integral with the first bend radius guide such that the grooming arm and the first bend radius guide are rotatably mounted to the base framework.

12. An integrated bend radius protection system in a fiber optic cable splice housing as recited in claim 10, and further wherein the first bend radius guide further comprises a first flange transverse to the outwardly facing curved surface and wherein the first flange is configured for insertion in a first bend radius guide groove in the base framework and has a passageway surface which further defines the fiber optic cable passageway.

13. An integrated bend radius protection system in a fiber optic cable splice housing as recited in claim 12, and further wherein:
the first bend radius guide groove has an outwardly angled outer side wall; and
the first flange has an outer edge which is configured to abut the outer side wall.

14. An integrated bend radius protection system in a fiber optic cable splice housing as recited in claim 13, and further wherein the outer edge of the first flange is bias forced against the outer side wall.

15. An integrated bend radius protection system in a fiber optic cable splice housing as recited in claim 13, and further wherein the outer edge of the first flange is bias forced against the outer side wall by a resilient latch on one of the base framework and the first bend radius guide, the resilient latch interacting with the other of the base framework and the first bend radius guide.

16. An integrated bend radius protection system in a fiber optic cable splice housing as recited in claim 10, and further wherein the forward edge is concave.

17. An integrated bend radius protection system in a fiber optic cable splice housing as recited in claim 10, and further comprising a second grooming arm integral with the first grooming arm, the second grooming arm being disposed across the opening of the passageway such that when the second grooming arm is rotated, the forward edge urges fiber optic cables protruding through the opening back into the passageway.

18. An integrated bend radius protection system in a fiber optic cable storage area, comprising:
a base framework with a first end and a second end, the base framework comprising:
an inlet passageway;
a first fiber bend radius guide at the first end disposed to receive fiber optic cables from the fiber input passageway;
a second fiber bend radius guide at the second end disposed to receive fiber optic cables from the first fiber bend radius guide;
an outlet passageway disposed to receive fiber optic cables from the second fiber bend radius guide;
a first inwardly facing curved passageway wall and a passageway base surface at the first end of the base framework;
wherein one of the first fiber bend radius guide and the second fiber bend radius guide is comprised of: an outwardly facing curved surface; wherein the first inwardly facing curved passageway wall, the passageway base surface and the outwardly facing curved surface, define a fiber optic cable passageway with an opening, and
a first grooming arm rotatably mounted to the base framework and disposed across the opening of the passageway such that when the first grooming arm is rotated, a forward edge of the first grooming arm urges fiber optic cables protruding through the opening back into the passageway.

19. An integrated bend radius protection system in a fiber optic cable storage area as recited in claim 18 and wherein the grooming arm is integral with the first bend radius guide such that the grooming arm and the first bend radius guide are rotatably mounted to the base framework.

20. An integrated bend radius protection system in a fiber optic cable storage area as recited in claim 18, and further wherein the first bend radius guide further comprises a first flange transverse to the outwardly facing curved surface and wherein the first flange is configured for insertion in a first bend radius guide groove in the base framework and has a passageway surface which further defines the fiber optic cable passageway.

21. An integrated bend protection system in a fiber optic cable storage area as recited in claim 20, and further wherein:

the first bend radius guide groove has an outwardly angled outer side wall; and the first flange has an outer edge which is configured to abut the outer side wall.

22. An integrated bend radius protection system in a fiber optic cable storage area as recited in claim 21, and further wherein the outer edge of the first flange is bias forced against the outer side wall.

23. An integrated bend radius protection system in a fiber optic cable storage area as recited in claim 22, and further wherein the outer edge of the first flange is bias forced against the outer side wall by a resilient latch on one of the base framework and the first bend radius guide, the resilient latch interacting with the other of the base framework and the first bend radius guide.

24. An integrated bend radius protection system in a fiber optic cable storage area as recited in claim 18, and further wherein the forward edge is concave.

25. An integrated bend radius protection system in a fiber optic cable storage area as recited in claim 18, and further comprising a second grooming arm integral with the first grooming arm, the second grooming arm being disposed across the opening of the passageway such that when the second grooming arm is rotated, the forward edge urges fiber optic cables protruding through the opening back into the passageway.

* * * * *